US00RE48718E

(19) United States
(12) Reissued Patent
Pocatko

(10) Patent Number: US RE48,718 E
(45) Date of Reissued Patent: Sep. 7, 2021

(54) HELMET SYSTEM AND SAFETY DEVICE FOR USE WITH A HELMET

(71) Applicant: J. Nolan Group LLC, Ashtabula, OH (US)

(72) Inventor: Tim M. Pocatko, Ashtabula, OH (US)

(73) Assignee: J. Nolan Group LLC, Ashtabula, OH (US)

(21) Appl. No.: 16/367,011

(22) Filed: Mar. 27, 2019

Related U.S. Patent Documents

Reissue of:
(64) Patent No.: 9,603,404
Issued: Mar. 28, 2017
Appl. No.: 14/168,255
Filed: Jan. 30, 2014

U.S. Applications:
(60) Provisional application No. 61/803,990, filed on Mar. 21, 2013.

(51) Int. Cl.
*A42B 3/04* (2006.01)

(52) U.S. Cl.
CPC ..... *A42B 3/0473* (2013.01)

(58) Field of Classification Search
CPC ..... A42B 3/0473; A42B 3/0406; A42B 3/04; A42B 3/08; A63B 71/10; A61F 5/05883; A61F 5/055; A61F 5/3707
See application file for complete search history.

(56) References Cited

U.S. PATENT DOCUMENTS 3,671,974 A * 6/1972 Sims ..... A42B 3/0473 2/421
3,818,509 A 6/1974 Romo et al.
3,873,996 A 4/1975 Varteressian
3,900,896 A 8/1975 Ackerman
4,638,510 A 1/1987 Hubbard
4,884,301 A 12/1989 Aileo
5,123,408 A 6/1992 Gaines
5,242,377 A * 9/1993 Boughner ..... A61F 5/055 602/17
5,261,125 A 11/1993 Cartwright et al.
5,272,770 A * 12/1993 Allen ..... A42B 3/0473 2/421
5,371,905 A 12/1994 Keim
5,390,367 A 2/1995 Rush, III
5,437,613 A * 8/1995 Reggio ..... A42B 3/0473 2/425
5,517,699 A 5/1996 Abraham, II
5,566,399 A 10/1996 Cartwright et al.
5,581,816 A 12/1996 Davis
5,581,820 A 12/1996 Cartwright et al.
(Continued)

*Primary Examiner* — Catherine S Williams
(74) *Attorney, Agent, or Firm* — Medley, Behrens & Lewis LLC; Lorri W. Cooper

(57) ABSTRACT

A helmet system has a restraint feature for deterring neck injuries that includes a helmet having an attachment member at the rear of the helmet and a tether coupled to the attachment member at the rear of the helmet. The tether couples the helmet to a part of the body of a user in order to limit movement of the helmet. A safety feature for use with a helmet in order to deter neck injuries includes a tether having a first connector at one end for fixedly mating with a helmet and a second connector at the other end for mating with a part of a body of a user. The tether is positionable in the rear neck area of a user.

20 Claims, 6 Drawing Sheets

(56) References Cited

U.S. PATENT DOCUMENTS 6,006,368 A 12/1999 Phillips
6,052,835 A 4/2000 O'Shea
6,363,540 B1 * 4/2002 Myers ..... A42B 3/0473 2/421
6,481,026 B1 11/2002 McIntosh
6,751,809 B1 6/2004 Cooper et al.
6,810,535 B1 11/2004 Moloney
6,813,782 B2 11/2004 Kintzi et al.
6,871,360 B1 3/2005 Ashline
6,886,186 B2 5/2005 Jansen
6,931,669 B2 8/2005 Ashline
6,971,123 B2 12/2005 Weaver
7,155,747 B2 1/2007 Baker
7,380,290 B2 6/2008 Mothaffar
7,395,558 B2 7/2008 Mothaffar
7,404,402 B2 * 7/2008 Yu ..... A61F 9/029 128/857
7,430,767 B2 10/2008 Nagely
7,765,623 B2 8/2010 Ashline
7,861,326 B2 1/2011 Harty
7,941,873 B2 5/2011 Nagely et al.
8,046,846 B2 11/2011 Karlsson et al.
8,074,301 B2 12/2011 Mothaffar
8,181,281 B2 5/2012 Nagely et al.
8,256,026 B2 9/2012 Garrigos
8,341,770 B2 1/2013 Siegler et al.
9,603,404 B2 3/2017 Pocatko
2004/0064874 A1 * 4/2004 Weaver ..... A42B 3/0473 2/422
2004/0068779 A1 * 4/2004 Duffy ..... A42B 3/0473 2/422
2004/0226081 A1 11/2004 Mrowka et al.
2004/0255368 A1 * 12/2004 Baker ..... A42B 3/0473 2/410
2006/0021117 A1 * 2/2006 Madonia ..... A42B 3/0406 2/422
2006/0260027 A1 * 11/2006 Rhodes ..... A42B 3/0473 2/421
2007/0209667 A1 * 9/2007 Yu ..... A42B 3/0473 128/875
2008/0209617 A1 9/2008 Castillo
2008/0313791 A1 * 12/2008 Nagely ..... A42B 3/0473 2/425
2010/0083424 A1 4/2010 Linares
2010/0229287 A1 * 9/2010 Mothaffar ..... A41D 13/0512 2/421
2011/0035865 A1 * 2/2011 Olivarez ..... A42B 3/0473 2/462
2011/0083240 A1 4/2011 Crye et al.
2011/0099675 A1 5/2011 Parks et al.
2011/0277225 A1 11/2011 Salkind et al.
2012/0278977 A1 11/2012 Rocklin
2014/0053324 A1 * 2/2014 Jackson ..... A42B 3/0473 2/425

* cited by examiner

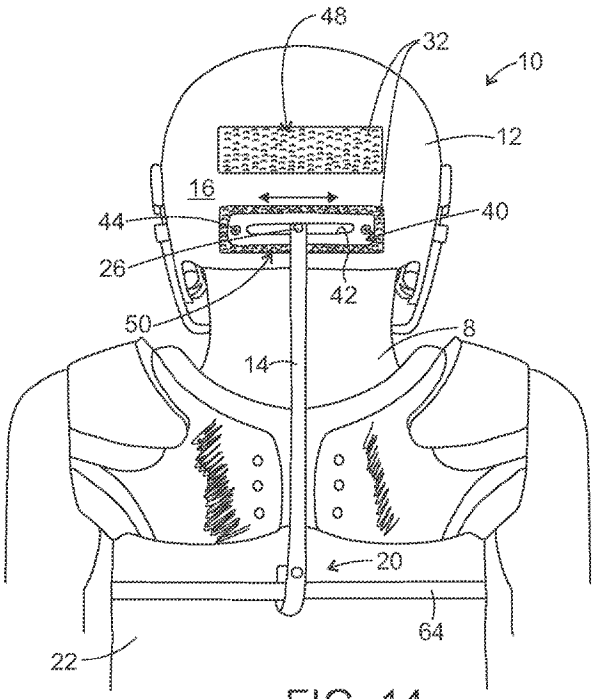
FIG. 14
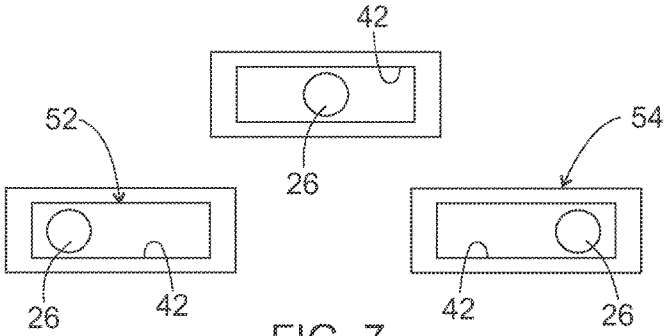
FIG. 7
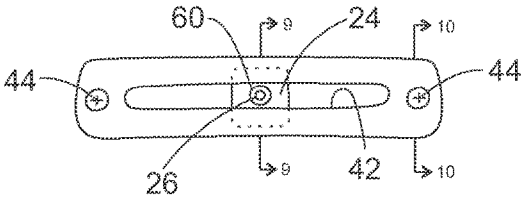
FIG. 8
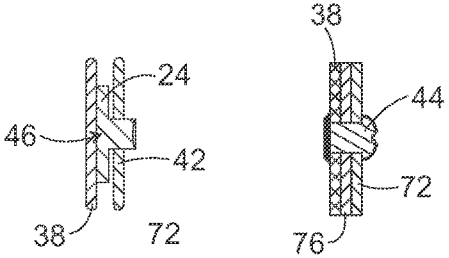
FIG. 10
FIG. 9

HELMET SYSTEM AND SAFETY DEVICE FOR USE WITH A HELMET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The examples described herein concern a helmet and a safety device for use with a helmet that can be utilized to help deter common head and neck injuries in contact sports.

BACKGROUND

Head and neck injuries in contact sports may occur when a player bends their neck down in order to contact another player. The force applied from this type of movement and contact can result in head and neck injuries. FIG. 1 shows a prior art football helmet 2 positioned on a user's head and the motion that can occur when a user drops their head down. The chin 4 hits the chest 6 and this can result in neck 8 injuries, particularly if a player hits another player in this position. In addition, players will often drop their heads in order to engage in a head-to-head collision. This is dangerous and, in addition, to leading to neck 8 injuries, can lead to head injuries, such as concussions.

SUMMARY

A helmet system having a restraint feature for deterring injuries is disclosed and described herein. A safety feature for use with a helmet in order to deter injuries is also disclosed and described herein.

BRIEF DESCRIPTION OF THE DRAWINGS

FIG. 7 is a schematic representation of a slider than can be mounted to a helmet and the different positions that the slider may be positioned during normal use;

FIG. 8 is a plan view of a slider for use with the example helmet system;

FIG. 9 is a cross-sectional view of the slider of FIG. 8 taken at line 9-9 in FIG. 8;

FIG. 10 is a cross-sectional view of the slider of FIG. 8 taken at line 10-10 in FIG. 8;

FIG. 14 is a rear view of yet another example helmet system;

DETAILED DESCRIPTION

Figure 6:
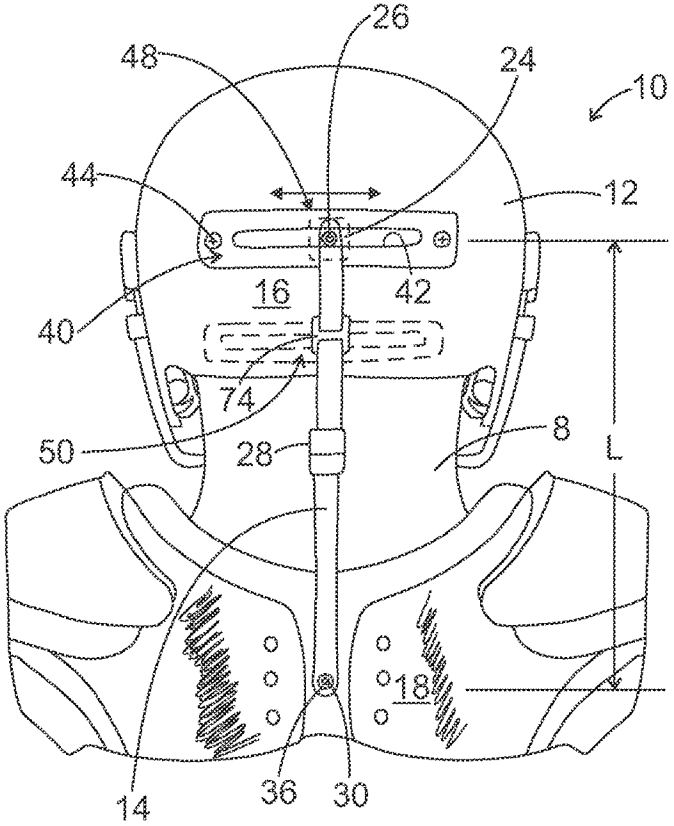
FIG. 6 is a rear view of another example helmet system.

An example helmet system 10 is described herein. The example helmet system 10 assists in restraining a user's neck 8 and chin 4 from bending forward until it hits the user's chest. Many neck and head injuries occur in sport when user's lower their heads against an opponent. The example helmet system 10 helps to prevent or at least deter such injuries by providing a safety device, such as a tether 14, that can prevent or deter a user from bending their chin 4 downwardly until it hits their chest, breastbone, or shoulder pads 6. The example helmet system 10 provides a helmet 12 that utilizes a device to prevent a wearer from being able to bring their chin 4 to their breastbone 6 by restraining movement of the chin 4 and neck 8 in relation to the shoulder pads and/or the wearer's chest 6.

The example helmet system 10 utilizes a known helmet 12 and attaches a tether 14, such as a strap or cord, to the rear 16 of the helmet. The tether 14 may be attached to back of the player's shoulder pads 18, in the case of football, or can be attached to a body harness 20 that is secured around a player's torso 22 or midriff. The tether 14 may be a plastic strap, a rope, a cord, a fabric strap, or any other type of elongated flexible, but preferably non-stretchy member. The tether 14 is coupled to the helmet 12 at a first end and to the user's body at the other, second end. The tether 14 may be coupled between the helmet and the user's body such that some slack is in the tether 14 in order to permit some forward movement of the chin, but not enough movement to permit the user's chin to contact their chest. The tether 14 may be adjustable so that the same or similar tethers 14 can be used for different users. Alternatively, the tether 14 may have limited slack or no slack so that a user cannot move their chin in any significant manner toward their chest.

A slide member 24 may be installed on the back 16 of the helmet 12 so that one end of the tether 14 can slide from side to side when the player turns his/her head. The slide member 24 may include a snap, button, hook, or other attachment member for coupling with the first end of the tether 14. This way, the player's head may move freely from side to side.

The tether 14 normally remains loose until the head drops. Then the tether 14 becomes taut and will not allow the user to drop their chin 4. This, in turn, can help to avoid injuries to the player's neck 8 or head.

The system 10 may include a breakaway clip 28 that is positioned on the tether 14, or on or in connection with one of the attachment members. In the event that a competitor pulls outwardly on the tether 14, the breakaway feature 28 will allow the tether 14 to break. The tether 14 will not break when it encounters a head drop since the force applied in this instance will be substantially along the length L of the tether 14, or longitudinally. The breakaway feature 28 is designed to help to prevent injury to a player when the tether 14 is pulled on.

Figure 2:
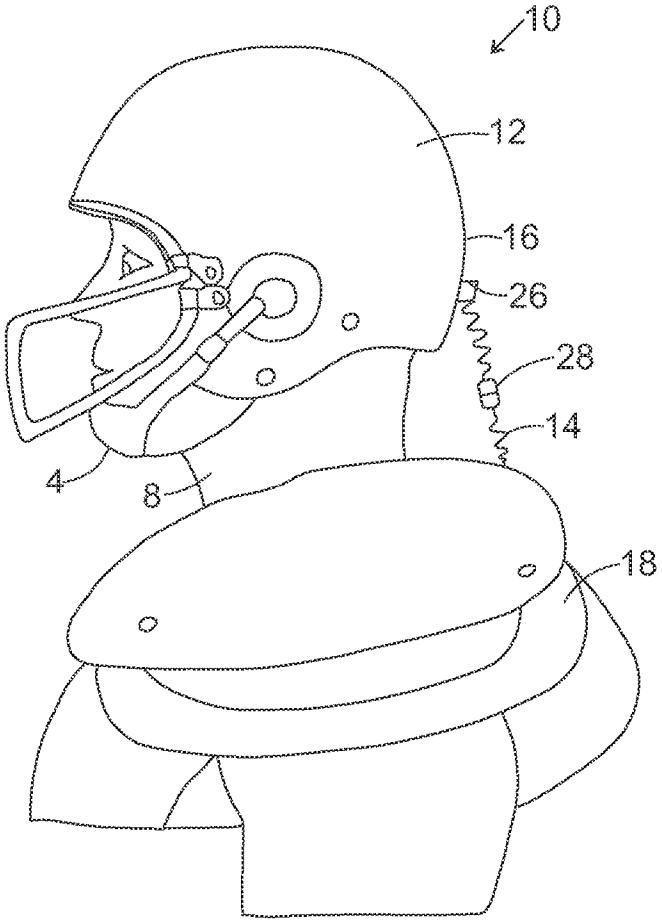
FIG. 2 is side view of a user wearing an example helmet system, with the restraint of the system in an unextended position.

Referring to the drawings, FIG. 2 depicts an example helmet system 10 that includes a helmet 12 having an attachment member positioned on a rear 16 surface of the helmet, a fastener 30 positioned on the shoulder pads 18 of a user below the neck, and a tether 14 in the form of a cord coupled between the attachment member and the fastener 30. The attachment member is positioned above the neck of the user on the rear 16 surface of the helmet. The cord 14 is shown as having some slack, as indicated by the wavy line of the cord 14. The cord 14 extends generally length-wise along the length of a user's body. A breakaway member 28 is positioned on the cord 14 in approximately the center of the cord 14 and permits the cord 14 to be broken into two sections if an outward force is applied to the cord 14, such as by an opponent grabbing the cord 14. The breakaway member 28 will not break apart due to the existence of longitudinal tension.

The attachment member is coupled to the helmet 12 in approximately the center rear 48 of the helmet 12 and can be any type of attachment member, such as a snap, hook, rivet, button, or the like. The snap 60 or hook 62 may be permanently applied to the helmet 12. Alternatively, the attachment member may be coupled to the outer surface of the helmet 12 with hook and loop type tape 32 or an adhesive, such as an epoxy. A fastener 30 is also coupled to the shoulder pads 18 of a user. The fastener 30 may also be a snap, hook, rivet, button, or the like and may be coupled to the shoulder pads 18 permanently or via hook and loop type tape 32 or adhesive. The cord 14 has connectors 34, 36 at each end thereof for mating with the attachment member on the helmet 12 and the fastener 30 on the shoulder pads 18. The cord 14 has a length L that is suited for the particular user in order to prevent unwanted forward motion of the head. Cord length L and type may be customized depending upon the anatomy of a user.

Figure 1:
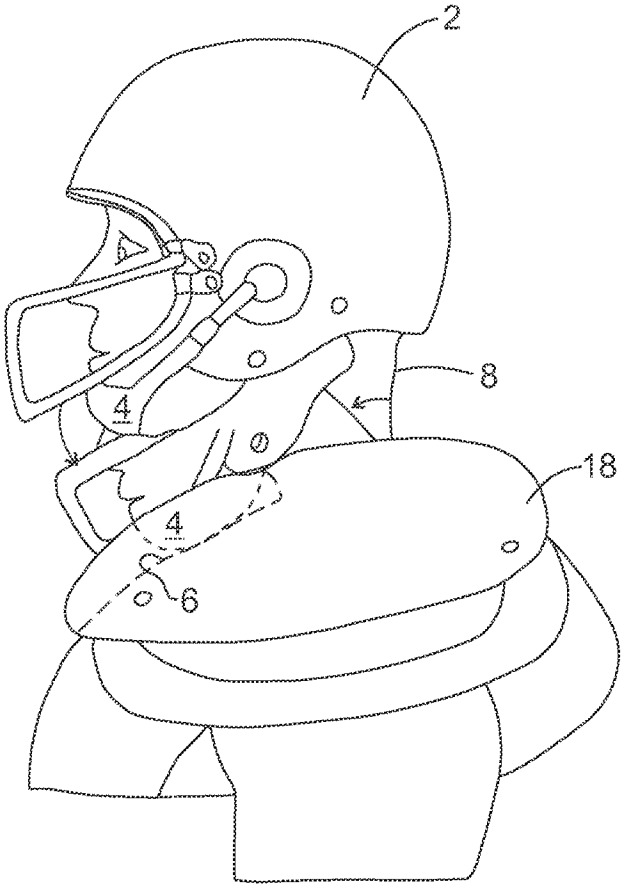
FIG. 1 (Prior Art)
FIG. 1 is a side view of a user wearing a prior art helmet without any type of restraint system and showing how the user's chin can bend to the chest of the user.
Figure 3:
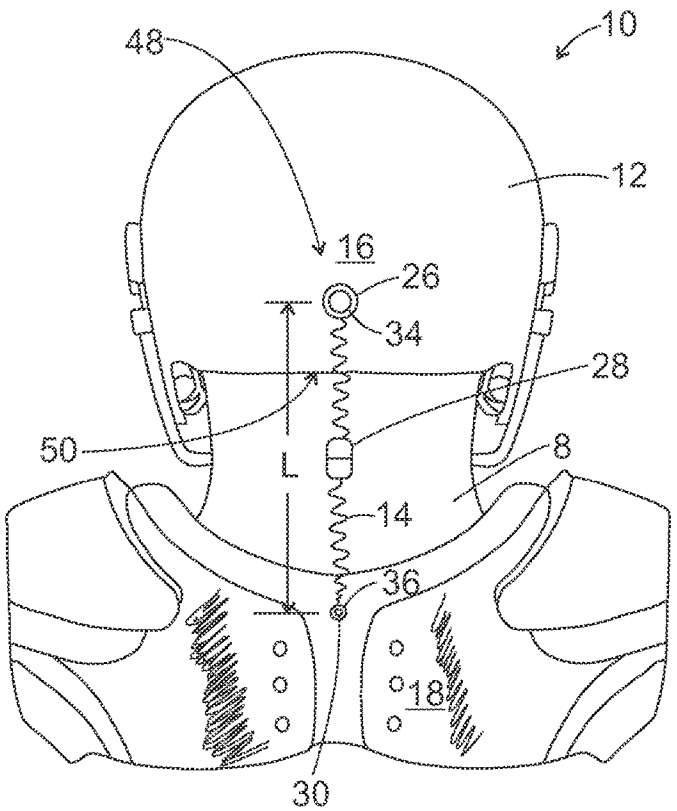
FIG. 3 is a rear view of the user wearing an example helmet system, as shown in FIG. 2.
Figure 5:
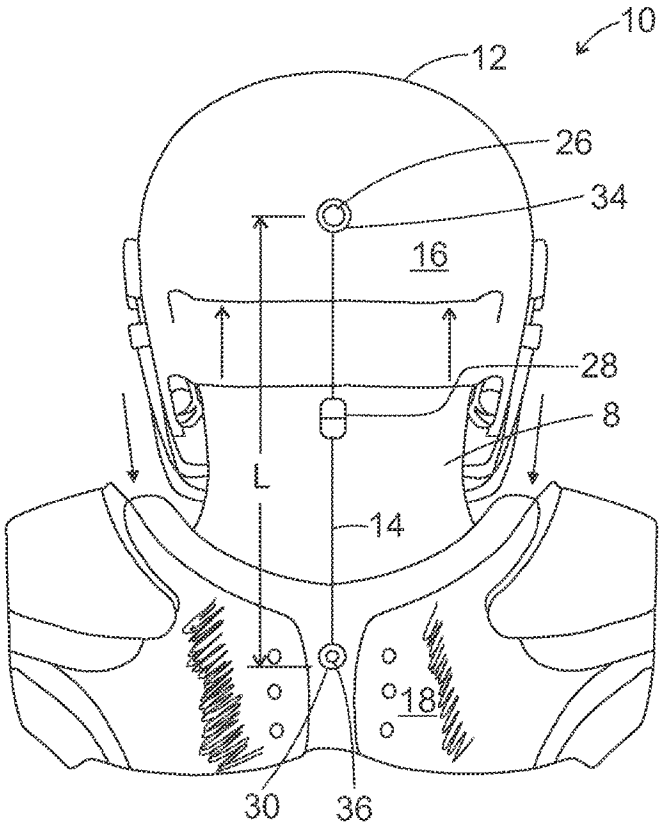
FIG. 5 is a rear view of the user and example helmet system of FIG. 4.
Figure 4:
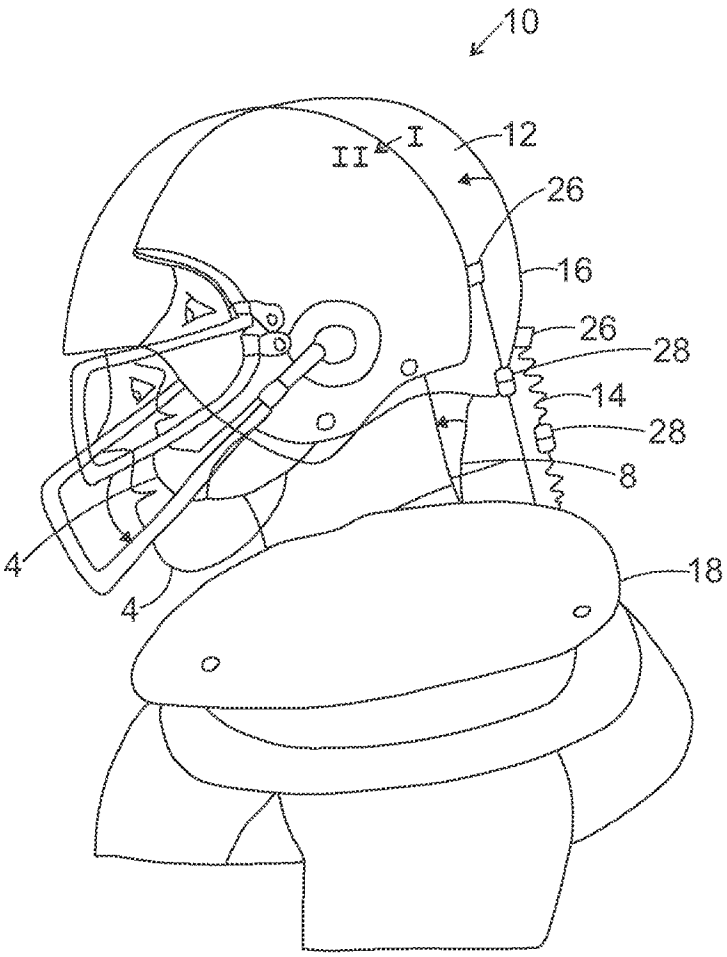
FIG. 4 is a side view of a user wearing an example helmet system showing how movement of the neck and chin is restrained by the example helmet system.

FIG. 4 depicts the helmet system 10 of FIGS. 2 and 3, but shows the head dropping from a first position to a second position. In the first position (1), the cord 14 is loose and has some slack. In the second position (2) the cord 14 is taut and the user's chin is moved downwardly toward the chest. FIG. 5 shows the cord 14 in a taut position from the rear 16, with the breakaway clip 28 positioned on the cord 14. As is evident upon comparison of the prior art device in FIG. 1 and the helmet system 10 in FIG. 4, the user's chin is prevented or deterred from moving all the way to the user's chest. This will help to deter neck and head injuries in the event of a collision with another user or the ground, for example. Because the cord 14 has slack in its normal position, the user may easily move his/her head from side to side up to the amount of slack in the cord 14.

FIG. 6 shows an alternative example helmet system 10 that utilizes a helmet 12 that has a slider mechanism 40 coupled to the helmet 12, a tether 14 such as a strap, and a fastener 30 associated with a user's shoulder pads 18. The helmet 12 is a typical helmet and the slider mechanism 40 that is coupled to an exterior surface of the helmet 12. As with the example shown in FIGS. 2-5, the helmet 12 includes an attachment member 26, which in this case is coupled directly to the slider mechanism 40. The shoulder pads 18 have a fastener 30 for coupling to an end of the strap 14. The strap 14 has a breakaway connector 28, such as a barrel breakaway connector 28 positioned at a central location. The strap 14 also has an adjustment buckle 74 that allows for adjustment of the length of the strap 14 such that the strap 14 can be used with different user's having differing anatomies. The strap 14 has first and second connectors 34, 36 at each end thereof for mating with the attachment member 26 and the fastener 30. The first connector 34 mates with the attachment member 26 and the second connector 36 mates with the fastener 30.

Referring to FIGS. 8-10, the slider mechanism 40 may be coupled to the helmet 12 in any known way, such as by adhesive, hook and loop type tape 32, or by more permanent means, such as rivets 68, and the like. The slider mechanism includes a bottom plate 38 and a top plate 72. The bottom plate 38 is a flat, solid sheet of smooth material and the top plate 72 is a flat, smooth sheet of material that has an elongated slot 42 that runs along the length of the top plate 72. The ends of the bottom plate 38 and the top plate 72 may be coupled together in any known manner. A T-nut 44 is shown in FIGS. 6, 8, and 10 for holding the top and bottom plates 72, 38 together. Alternatively, a rivet 68 or welding may be used, among other attachment techniques. A washer or other spacer 76 may be positioned between the top and bottom plates 72, 38 in order to provide consistent spacing between the top and bottom plates 72, 38. The slider mechanism 40 may be made of metal, plastic, or the like.

A slide member 24 is positioned between the top and bottom plates 72, 38 of the slider mechanism 40 so that the attachment member 26 extends outwardly (away from the helmet 12 in a substantially perpendicular manner) through the slot 42 in the top plate 72. The slide member 24 may be any shape, as long as it's retained between the top and bottom plates 72, 38. The slide member 24 has a flat, smooth bottom surface 46 that glides along the bottom plate 38 such that the slide member 24 moves freely back and forth along the length of the slot 42. The attachment member 26 extends through the slot 42 in order to assist in maintaining the slide member 24 in the slot 42 and to permit the first connector 34 on the strap 14 to mate with the attachment member 26. Other types of slider mechanisms may be used, as known by those of skill in the art, including mechanisms with greater parts.

FIG. 6 shows how the slider mechanism 40 can be positioned at different locations on the helmet 12. In a first location, the slider mechanism 40 is positioned in the center rear 48 of the helmet 12. A second position is shown as being adjacent the bottom 50 of the helmet 12 near the neck. Other locations may also be utilized for positioning the slider mechanism 40. The slider mechanism 40 permits a user to move their head from side to side when the tether 14 is installed, even if there is not a significant amount of slack in the strap 14. FIG. 7 depicts different positions that the slide member 24 may be positioned in the slider mechanism 40 during use. The slide member 24 would be positioned at the left side 52 of the slider mechanism 40 when the user moves their head to the left and at the right side 54 of the slider mechanism 40 when the user moves their head to the right.

Figure 12:
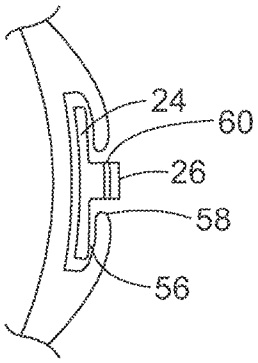
FIG. 12 is a cross-sectional view of the example helmet system of FIG. 11 taken through the slider along line 12-12 for a slider having a snap.
Figure 13:
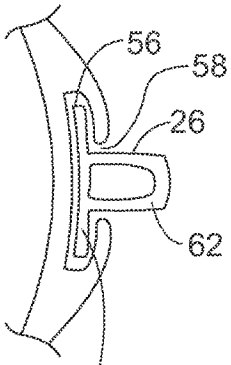
FIG. 13 is a cross-sectional view of the example helmet system of FIG. 11 taken through the slider along line 12-12 for a slider having a loop.
Figure 11:
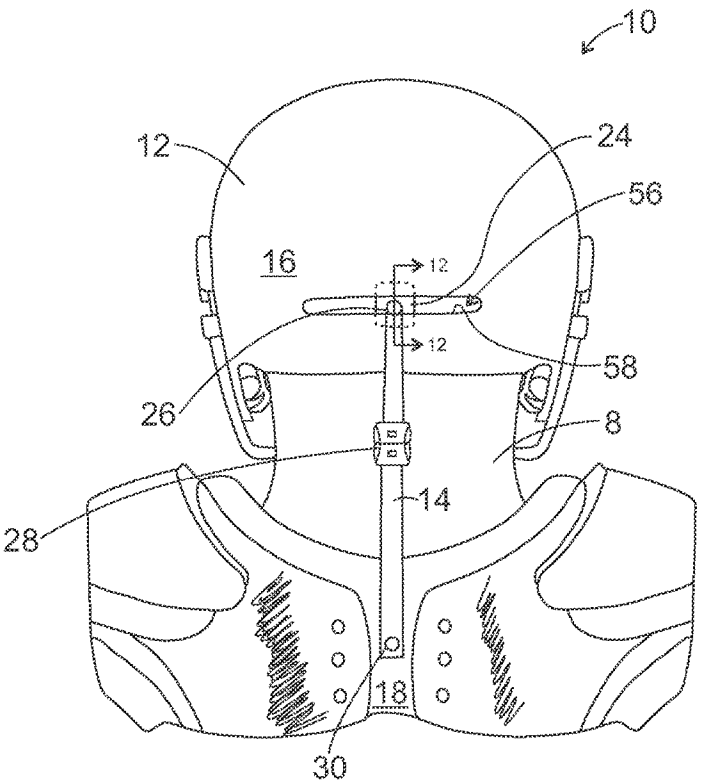
FIG. 11 is a rear view of another example helmet system.

FIGS. 11-13 depict an alternative example helmet system 10 where the slider mechanism 40 is integral with the helmet 12. In this example, during molding of the helmet 12 into its final form, a slide track 56 is formed inside the interior of the helmet 12 and a slide member 24 is positioned inside the slide track 56, such as through a trap door inside the helmet (not shown). FIG. 11 shows the slot 58 positioned in an outer surface of the rear 16 of the helmet and FIGS. 12-13 show the slide track 56 inside the wall of the helmet 12. A slide member 24 is positioned in the slide track 56 and has a part that extends outwardly from the slot 58 in order to couple with a tether 14. The tether 14 may have a breakaway feature 28, such as a breakaway buckle. FIG. 12 shows the attachment member 26 as being a snap 60. FIG. 13 shows the attachment member 26 as being a hook 62 or loop. The space inside the slide track 56 is dimensioned and configured to permit easy sliding of the slider mechanism 40 inside the track 56 and to avoid dislodgment of the slider mechanism 40 from the track 56. Other types of slider mechanisms may be used, as known by those of skill in the art. Other mechanisms that permit side to side movement, or similar movement, may alternatively be used.

FIG. 14 depicts an alternative example helmet system 10 that utilizes a type of hook and loop material 32 to couple the slider mechanism 40 to the rear 16 of the helmet. Two possible positions are shown for attachment, one being higher on the helmet 12 and one being lower. The slider mechanism 40 has a hook and look material applied to a bottom surface of the bottom plate 38 for mating with a hook and loop material 32 that is positioned on an exterior surface of the helmet 12. The hook and loop type material 32 has a holding strength in order to withstand pressures and forces associated with the particular sport or activity at issue. FIG. 14 also depicts a harness 20 that can be used instead of coupling the safety strap 14 to the user's shoulder pads 18. The harness 20 includes a portion that goes around the torso 22 of the user and is pulled tight with a tightening element (not shown in FIG. 14). The strap 14 may include a loop 66 at one end and the harness 20 may be positioned through the loop 66. The loop 66 can be riveted 68 or snapped 60 to the harness 20. The loop 66 may permit some movement of the strap 14 along the length of the harness 20. The strap 14 can be coupled to the harness 20 in any known manner. Again, the strap 14 and harness 20 should be custom fit to a user based upon their size and anatomy. The harness 20 is particularly useful in sports that require helmets, but that do not require shoulder pads 18. The strap 14 may be coupled to other parts of the uniform, if desired, or at other locations on the body of the user.

Figure 16:
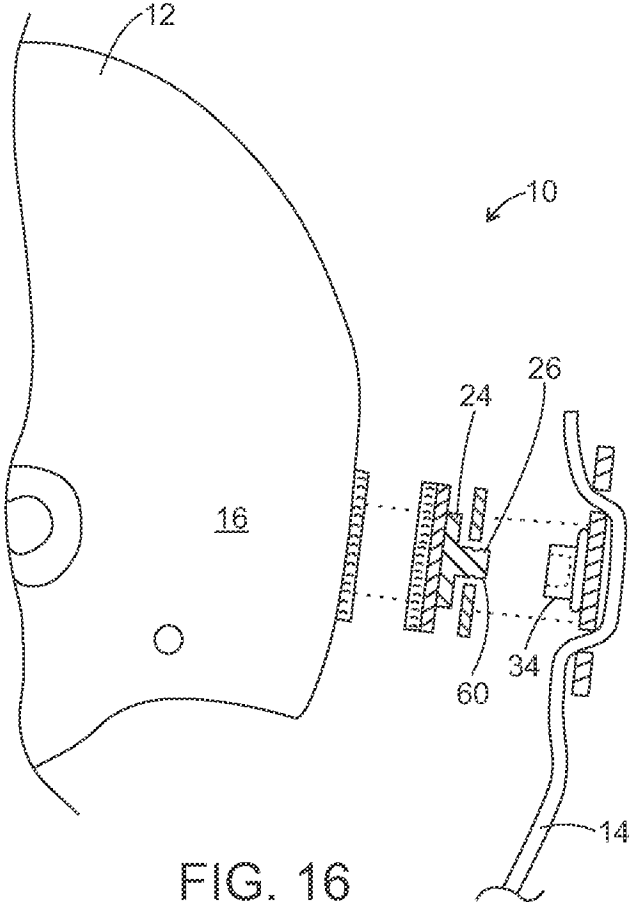
FIG. 16 is an expanded partial cross-sectional view of the example helmet system of FIG. 15.
Figure 15:
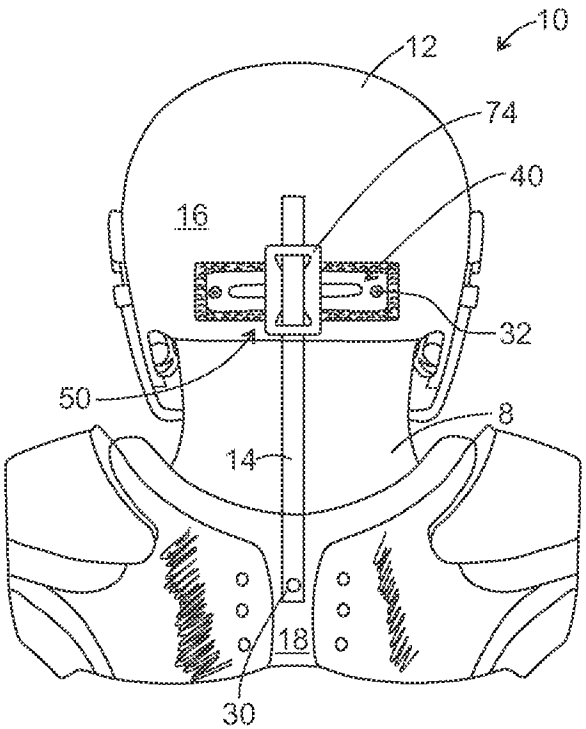
FIG. 15 is a rear view of a further example helmet system.

FIG. 15 is similar to FIG. 14, but includes a length adjusting mechanism for allowing adjustment of the length of the strap 14. In this case, a buckle 74 is coupled to the first connector 34 of the strap 14 and permits the strap 14 to be lengthened and shortened. The first connector 34 of the strap 14 couples with the attachment member 26 of the slider mechanism 40 as with prior examples. FIG. 16 depicts the various layers of the connector, attachment member 26, and strap 14. In particular, a hook and loop type material 32 is applied to an outer surface of the helmet 12. A slider mechanism 40 is provided that has a bottom plate 38 and a top plate 72 with a slot 42 in it. A hook and look type material is adhered or otherwise applied to the bottom surface of the bottom plate 38 so that the slider mechanism 40 can couple to the hook and loop material 32 on the helmet 12. A slide member 24 is positioned between the bottom and top plates 38, 72 and the attachment member 26 extends through the slot 42 of the top plate 72. The strap 14 includes a buckle 74 that is used to lengthen and shorten the strap 14. The buckle 74 is connected to a snap 60, which is the first connector 34 of the strap 14.

The example system 10 may be used with any type of helmet 12, including football helmets, riding helmets, bicycle helmets, racing helmets, wrestling helmets, skiing helmets, or any other known helmets. The slider mechanism 40 may be sold as an add-on item to a helmet 12 and may be applied after purchase of the helmet 12. The tether 14 may be a plastic or fabric strap that is about 1 inches wide, or thinner or wider. Other types of straps or cords may be used. The term tether 14 is meant to encompass any type of strap, cord, or connecting member and to the extent that one or another of the terms is used herein, it should be understood that the other may apply interchangeably. It should be recognized that use of one implies that the other can alternatively be used.

A breakaway device 28 may be utilized with any of the examples described herein. The breakaway device 28 may be any known type of breakaway 28 that will break apart with an outward pulling force. Examples of breakaway devices 28 include buckles, connectors, or snaps, such as barrel buckles or connectors, center or side release buckles, clip locks, or tuck, press, flat, swingable, or covered buckles, among other devices. The breakaway device 28 may be made of plastic, or other materials.

One type of hook and loop type of material 32 that may be utilized is Dura Lock™, a 3M product. Other types of hook and loop or similar materials may be utilized to couple the slider mechanism 40 to the rear 16 of the helmet. In addition, epoxy or other adhesives may be used. Alternatively, manufacturers of helmets may manufacture a clip or pin that extends through the helmet (not shown) and that can be coupled to an external slider, if desired. Any known way to couple a device to a helmet 12 may be utilized.

A helmet system 10 having a restraint feature for deterring injuries to the user includes a helmet 12 and a tether 14. The helmet 12 has an attachment member 26 at the rear 16 of the helmet. The tether 14 is coupled to the attachment member 26 at the rear 16 of the helmet. The tether 14 couples the helmet 12 to a part of the body of a user in order to restrain movement of the helmet 12 in at least one direction.

The tether 14 may be a strap or a cord connected between the attachment member 26 and the part of the body of the user. The tether 14 may be configured to mate at a lower end with a fastener 30 positioned on shoulder pads 18 of a user, or to couple with a harness 20 positioned around a user's torso 22.

The helmet 12 may include an elongated slider mechanism 40. A slide member 24 of the slider mechanism 40 may be being movable from side to side within the slider mechanism 40. The slider mechanism 40 may be coupled to a rear 16 of the helmet for permitting coupling with the tether 14. The slider mechanism 40 may be integral with the helmet 12, or the slider mechanism 40 may be configured to be added to a helmet 12. The slider mechanism 40 may include a hook and loop type of material 32 applied to a lower surface thereof. The helmet 12 may include a hook and loop type material 32 applied to an outer surface thereof for mating with the hook and loop type of material 32 of the slider mechanism 40. The hook and loop type material 32 may withstand substantial force so that the slider mechanism 40 is not removable from the helmet 12 under normal operating conditions associated with the use of the helmet 12. The slider mechanism 40 may be adhered to an outer surface of the helmet 12 with an adhesive.

The slider mechanism 40 may include a top plate 72 and a bottom plate 38. The top plate 72 may have a slot 42 positioned therethrough that extends along at least part of the length of the slider mechanism 40. The bottom plate 38 may have a bottom surface that forms a surface for abutting a helmet surface. The top and bottom plates 72, 38 may be coupled together at least at the ends thereof to form a slide track 56 between the top and bottom plates 72, 38. The attachment member 26 may be coupled to the slide member 24 and the slide member 24 may be slidable at least left and right on the rear 16 of the helmet.

The helmet system 10 may also include a breakaway feature 28 positioned on the tether 14 to permit the tether 14 to separate into at least two parts when a substantial lateral force is applied. The breakaway feature 28 may be a breakaway connector 28.

In another embodiment, a safety feature for use with a helmet 12 in order to deter injuries to the user includes a tether 14. The tether 14 has a first connector 34 at one end for fixedly mating with a helmet 12 and a second connector 36 at the other end for mating with a part of a body of a user. The tether 14 is positionable in the rear neck area of a user.

The tether 14 may include a breakaway feature 28 that permits the tether 14 to break when pulled outwardly in a direction that is substantially normal to a length L of the tether 14. The tether 14 may be a strap or a cord. The tether 14 may have an adjustment feature that permits the tether 14 to be lengthened and shortened. The first connector 34 may be a snap 60 and the second connector 36 may be a snap 60 or a loop 62.

In another embodiment, a helmet system 10 includes a helmet 12 and a slide member 24. The helmet 12 has an outer shell with a slot 42 formed in a rear 16 surface thereof. The slot 42 is provided adjacent a slide track 56 that is positioned inside of the helmet's outer shell. The slide member 24 is positioned in the slide track 56 and has an attachment member 26 for coupling with a tether 14.

The helmet system 10 may also include a tether 14 having a length L. The tether 14 may have a first connector 34 at one end and a second connector 36 at the other end, with the first connector 34 being connectable to the attachment member 26 on the slide member 24. The tether 14 may be a strap or a cord and may also include a breakaway connector 28 positioned on the tether 14 that permits the tether 14 to separate into two separate parts when a lateral force is applied to the tether 14. The slide track 56 may have walls that surround a substantial portion of the slide member 24, with the attachment member 26 extending outwardly from the outer shell of the helmet 12 through the slot 42.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A helmet system having a restraint feature for deterring injuries to the user comprising:

a helmet having a movable attachment member at the rear of the helmet; and a flexible, bendable tether coupled to the movable attachment member at the rear of the helmet, the tether coupling the helmet to a part of the body of a user in order to restrain movement of the helmet in a vertical, up and down, direction, wherein the movable attachment member is movable only horizontally and not vertically relative to a fixed position on a surface of the helmet, and includes a slider mechanism that is a plate-like member or a recess defined in the helmet to permit the attachment member to slidably move inside the plate-like member or inside the recess, with the slider mechanism conforming to the shape of the helmet, wherein the plate-like attachment member comprises at least one plate with a slot in the plate for receiving the movable attachment member, and the recess is accessible to receive the movable attachment member into the recess.

2. The helmet system of claim 1, wherein the tether is a strap or a cord connected between the attachment member and the part of the body of the user.

3. The helmet system of claim 1, wherein the tether is configured to mate at a lower end with a fastener positioned on shoulder pads of a user, or to couple with a harness positioned around a user's torso, or to couple to an upper part of a user's uniform.

4. The helmet system of claim 1, wherein the slider mechanism is an elongated slider mechanism, with the movable attachment member being movable from side to side within the slider mechanism, and the slider mechanism is coupled to a rear of the helmet for permitting coupling with the tether.

5. The helmet system of claim 4, wherein the slider mechanism is provided by the recess in the helmet such that it is integral with the helmet, or the slider mechanism is configured to be coupled to a helmet.

6. The helmet system of claim 5, wherein the slider mechanism includes a hook and loop type of material applied to a lower surface thereof, and the helmet includes a hook and loop type material applied to an outer surface thereof for mating with the hook and loop type of material of the slider, with the hook and loop type material withstanding substantial force so that the slider is not removable from the helmet under normal operating conditions associated with the use of the helmet; or the slider mechanism is adhered to an outer surface of the helmet with an adhesive.

7. The helmet system of claim 5, wherein the slider mechanism includes a top plate and a bottom plate, with the top plate having a slot positioned therethrough that extends along at least part of the length of the slider mechanism, the bottom plate having a bottom surface that forms a surface for abutting a helmet surface, and the top and bottom plates are coupled together at least at the ends thereof to form a slide track between the top and bottom plates.

8. The helmet system of claim 1, further comprising a breakaway feature positioned on the tether to permit the tether to separate into at least two parts when a lateral force that is sufficient to break the breakaway feature is applied.

9. The helmet system of claim 8, wherein the breakaway feature is a breakaway connector.

10. A helmet system comprising:

a helmet having an outer shell with a slot formed in a rear surface thereof, with the slot being provided adjacent a slide track that is positioned inside of the helmet's outer shell in order to provide lateral, side-to-side movement but deter vertical, up and down, movement of the helmet; and a slide member positioned in the slide track, said slide member having an attachment member connected to with a bendable, flexible, non-stretchy tether.

11. The helmet system of claim 10, further comprising:

the tether having a length, with a first connector at one end and a second connector at the other end, with the first connector being connectable to the attachment member on the slide member.

12. The helmet system of claim 10, wherein the tether is a strap or a cord and further comprising a breakaway connector positioned on the tether that permits the tether to separate into two separate parts when a lateral force is applied to the tether.

13. The helmet system of claim 10, wherein the slide track has walls that surround and trap a portion of the slide member, with the attachment member extending outwardly from the outer shell of the helmet through the slot.

*14. A helmet system having a restraint feature for deterring injuries to the user comprising:*

*a helmet having a movable attachment member coupled to the helmet; and*

*a flexible, bendable tether coupled to the movable attachment member, the tether coupling the helmet to a part of the body of a user to restrain movement of the helmet in a vertical, up and down, direction,*

*wherein the movable attachment member is movable only horizontally and not vertically relative to a fixed position on a surface of the helmet, with the movable attachment member including one of:*

*a slider mechanism that is a plate-like member coupled to the helmet to permit the attachment member to slidably move inside the plate-like member, with the slider mechanism conforming to the shape of the helmet, wherein the plate-like member comprises at least one plate with a slot for receiving the movable attachment member; or*

*a slider mechanism that is a recess defined in the helmet to permit the attachment member to slidably move inside the recess, and the recess is accessible to receive the movable attachment member into the recess.*

*15. The helmet system of claim 14, wherein the tether is a strap or a cord connected between the attachment member and the part of the body of the user.*

*16. The helmet system of claim 14, wherein the tether is configured to mate at a lower end with a fastener positioned on shoulder pads of a user, or to couple with a harness positioned around a user's torso, or to couple to an upper part of a user's uniform.*

*17. The helmet system of claim 14, wherein the slider mechanism includes a hook and loop type of material applied to a lower surface thereof, and the helmet includes a hook and loop type material applied to an outer surface thereof for mating with the hook and loop type of material of the slider, with the hook and loop type material withstanding substantial force so that the slider is not removable from the helmet under normal operating conditions associated with the use of the helmet; or*

*the slider mechanism is adhered to an outer surface of the helmet with an adhesive.*

*18. The helmet system of claim 14, further comprising a breakaway feature positioned on the tether to permit the tether to separate into at least two parts when a lateral force that is sufficient to break the breakaway feature is applied.*

*19. The helmet system of claim 18, wherein the breakaway feature is a breakaway connector.*

*20. The helmet system of claim 14, wherein the slider mechanism includes a slide track defined in the recess, with the slider mechanism having walls that surround and trap a portion of the attachment member, with the attachment member extending outwardly from the helmet through the recess.*

* * * * *